United States Patent
Pihl

(10) Patent No.: US 6,813,123 B2
(45) Date of Patent: Nov. 2, 2004

(54) METHOD FOR PROTECTING A DC GENERATOR AGAINST OVERVOLTAGE

(75) Inventor: Magnus Pihl, Växjö (SE)

(73) Assignee: Alston Power N.V., Amsterdam (NL)

( * ) Notice: Subject to any disclaimer, the term of this patent is extended or adjusted under 35 U.S.C. 154(b) by 19 days.

(21) Appl. No.: 10/257,446

(22) PCT Filed: Apr. 10, 2001

(86) PCT No.: PCT/SE01/00790

§ 371 (c)(1),
(2), (4) Date: Apr. 11, 2003

(87) PCT Pub. No.: WO01/78208

PCT Pub. Date: Oct. 18, 2001

(65) Prior Publication Data

US 2003/0161083 A1 Aug. 28, 2003

(30) Foreign Application Priority Data

Apr. 12, 2000 (SE) .............................. 0001338

(51) Int. Cl.[7] .............................................. H02H 7/06
(52) U.S. Cl. ....................................................... 361/20
(58) Field of Search ............................ 361/20, 52, 21, 361/33, 91.1, 91.2, 100, 220, 212, 213, 216; 318/599, 254, 439; 323/241; 95/6; 364/551.01

(56) References Cited

U.S. PATENT DOCUMENTS

| | | | |
|---|---|---|---|
| 4,390,831 A | | 6/1983 | Byrd et al. |
| 4,698,719 A | * | 10/1987 | Taarning ...................... 361/87 |
| 4,779,182 A | | 10/1988 | Mickal et al. |
| 4,860,149 A | * | 8/1989 | Johnston ...................... 361/79 |
| 4,890,214 A | | 12/1989 | Yamamoto |
| 5,068,811 A | * | 11/1991 | Johnston et al. ............ 700/297 |
| 5,625,279 A | | 4/1997 | Rice et al. |
| 5,639,294 A | | 6/1997 | Ranstad |
| 5,689,177 A | * | 11/1997 | Nielsen et al. .............. 323/241 |

FOREIGN PATENT DOCUMENTS

| | | |
|---|---|---|
| EP | 0 209 714 B1 | 1/1987 |
| SE | 9703247-8 | 9/1997 |
| WO | WO 98/42444 | 10/1998 |
| WO | WO 99/12649 | 3/1999 |

* cited by examiner

*Primary Examiner*—Brian Sircus
*Assistant Examiner*—James A. Demakis
(74) *Attorney, Agent, or Firm*—Harness, Dickey & Pierce, P.L.C.

(57) ABSTRACT

A method is for protecting a DC generator against overvoltage in the event of a loss of load. A voltage limit value is defined and, when starting the current generator, one or a few small current pulses are generated during an initial phase. The voltage is measured across the output of the current generator during the initial phase and the voltages measured across the output of the current generator are compared with the voltage limit value. There is a changeover to normal operation only if all the voltages across the output of the current generator measured during the initial phase are below the voltage limit value. The current generation is interrupted and a loss of load is indicated if any one of the voltages across the output of the current generator measured during the initial phase exceeds the voltage limit value.

23 Claims, 4 Drawing Sheets

METHOD FOR PROTECTING A DC GENERATOR AGAINST OVERVOLTAGE

TECHNICAL FIELD

The present invention relates to a method for protecting a DC generator against overvoltage in the event of a loss of load.

The method is particularly intended for use with the supply of direct current to an electrostatic precipitator, comprising discharge electrodes and collecting electrodes, with the object of maintaining a constant or varying DC voltage between these electrodes.

TECHNICAL BACKGROUND

Electrical energy is usually supplied to consumers with the requirement that the voltage at the point of supply will remain constant. This applies within prescribed limits of the current intensity. In reality, it usually means that the voltage is slightly too high when there is a low load and that in the event of an overload the voltage drops below the specified normal value. The power source is a voltage generator that can deliver a particular maximal voltage, and a small, but not negligible, internal resistance provides a falling voltage when the current increases.

In other connections, it is rather a case of sources that instead deliver a constant or almost constant current with greatly varying voltage at the point of supply. These current generators can give very great voltage rises when the current is interrupted or when the current is at least intended to be interrupted. This often results in damage, such as material migration and damaged switches or burnt-out measuring instruments, while in other cases it is desirable, as in the ignition system in a car.

With modern electronics, it is possible to construct voltage transducers which, combined with rectifiers, work essentially as constant current generators. Examples of such are to be found in DE 35 22 568, DE 35 22 569, U.S. Pat. No. 5,639,294 and SE 9703247-8. The components included in the equipment shown have usually, however, rather limited tolerance to overvoltage and can be damaged thermally in quite a short time. This means that a total loss of load can result in the equipment being damaged severely within an interval of time that is shorter than the interval of time needed for the safety systems to be able to interrupt the voltage supply.

Generally, the loss of load can either be due to something happening during operation that means that the contact between the current generator and the load is broken or to the current generator being started by mistake while the load is disconnected.

The references mentioned above concern current supply to electrostatic precipitators. This means high mechanical stability and very robust constructions. In these cases, the most common cause of a fault is that the rectifier, that is the current generator, is restarted after stoppage and maintenance, without the load being reconnected.

THE OBJECT OF THE INVENTION

The main object of the present invention is to provide a method for avoiding fatal breakdowns in modem power supply units due to them being started without the load being connected or without a sufficiently large load being connected.

Another object of the present invention is to increase the reliability of electrostatic precipitators by reducing the risk of stoppages due to rectifier breakdowns resulting from starting without the load being connected.

SUMMARY OF THE INVENTION

The present invention relates to a method for protecting a DC generator against overvoltage in the event of a loss of load.

In the method according to the invention, a voltage limit value is defined and, when starting the current generator, one or a few small current pulses are generated during an initial phase. The voltage is measured across the output of the current generator during the initial phase and the voltages measured across the output of the current generator are compared with the voltage limit value. There is a changeover to normal operation only if all the voltages across the output of the current generator measured during the initial phase are below the voltage limit value. The current generation is interrupted and a loss of load is indicated if any one of the voltages across the output of the current generator measured during the initial phase exceeds the voltage limit value.

GENERAL DESCRIPTION OF THE INVENTION

For modem voltage transducers of the type called current generators, a loss of load results in the risk of catastrophic damage to the equipment. In order to avoid such DC generators being started by mistake without a load being connected, a special starting procedure is proposed according to the present invention.

During an initial phase, one or a few small current pulses are generated by the current generator. The voltage is measured across the output of the current generator during the initial phase and the measured voltages are compared with a set limit value. If any one of the measured voltages exceeds the set limit value, the starting procedure is stopped. If all the measured voltages are below the set limit value, there is change-over to normal operation. By voltage is meant, in this connection, the absolute amount of the voltage without taking polarity into account. If the main polarity is negative, this is disregarded.

The duration of the initial phase can, without problems, be short, for example less than 1 second, preferably less than 0.1 second and particularly preferably less than 0.01 second. The number of current pulses can be between 1 and 10, preferably 1–2, each with a duration less than 10 microseconds, preferably each with a duration less than 5 microseconds.

The voltage limit value should essentially be less than both the maximal permitted output voltage of the DC generator and the normal operating voltage for the application. It can suitably be selected between 10% and 50% of the normal operating voltage, but the method also permits lower voltage limit values. If there are appropriate conditions in measuring practice, the lowest limit is set as the quotient between the capacitance of the open output and the capacitance of the load.

The total charge that is applied during the initial phase should be selected in such a way that the current generator without load obtains an output voltage between the voltage limit value and the normal operating voltage and in such a way that the current generator with load obtains an output voltage below the voltage limit value. The total charge which is applied during the initial phase is suitably selected in such a way that the current generator with load obtains an output voltage below 10% of the normal operating voltage, preferably below 1% of the normal operating voltage.

The method according to the invention can be used for a number of different applications where a DC generator of the constant current generator type is used. The main object of this invention is, however, to use the method at the start of the supply of direct current to an electrostatic precipitator, comprising discharge electrodes and collecting electrodes, with the object of maintaining a constant or varying DC voltage between these electrodes.

The method according to the invention is preferably intended to be used at the start of the supply of pulsating direct current to an electrostatic precipitator, preferably at the start of the supply of direct current from a frequency-modulated voltage transducer, the output voltage of which is transformed and rectified.

BRIEF DESCRIPTION OF THE DRAWINGS

The invention will now be described in greater detail with reference to the accompanying drawings in which.

DESCRIPTION OF PROPOSED EMBODIMENT

Figure 1:
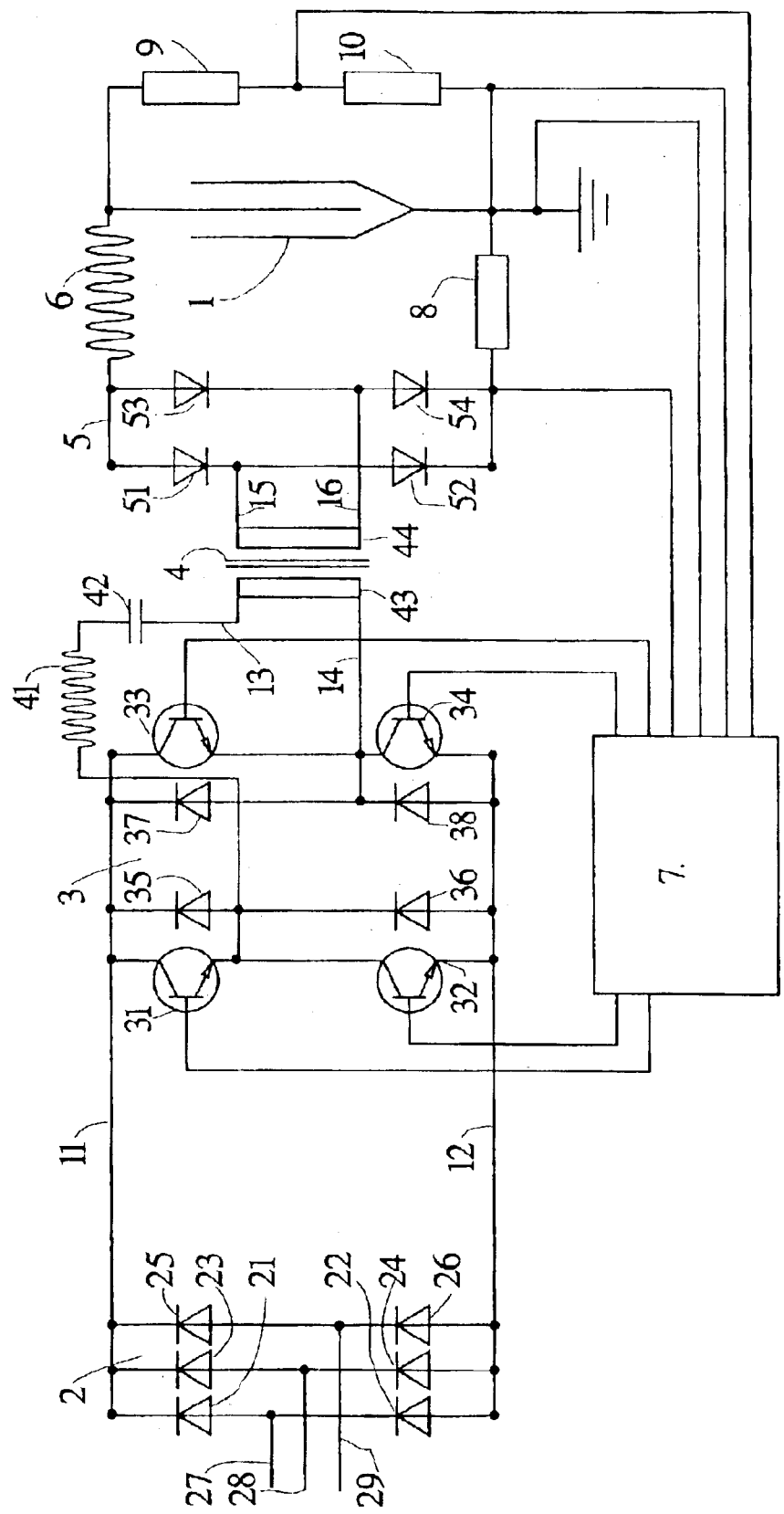
FIG. 1 shows an outline circuit diagram of the current supply to an electrostatic precipitator.

FIG. 1 shows in an outline circuit diagram a current generator in the form of a voltage transducing device that supplies high-voltage direct current to a precipitator 1. The device consists of a three-phase rectifier bridge 2, a pulse generator 3, a transformer 4, a full wave rectifier bridge 5 for single-phase, a choke 6 and control equipment 7 with associated measurement resistors 8, 9 and 10.

The three-phase rectifier bridge 2 comprises six diodes 21 to 26 and is connected via three conductors 27, 28, 29 to a normal three-phase AC network.

The pulse generator 3 consists of four transistors 31–34 and four diodes 35–38. The transistors are controlled by their bases being connected to the control equipment 7.

Between the pulse generator 3 and the primary winding 43 of the transformer 4, a series resonance circuit is connected consisting of a choke 41 and a capacitor 42.

The full wave rectifier bridge 5 consists of four diodes 51–54.

In addition to the connection to the transistors 31–34, the control equipment 7 is connected to a measurement resistor in series with the precipitator 1, for measuring the current to the electrodes of the precipitator, and to a voltage divider consisting of two resistors 9 and 10 connected in parallel with the output of the current generator for measuring the relevant voltage.

Figure 2:
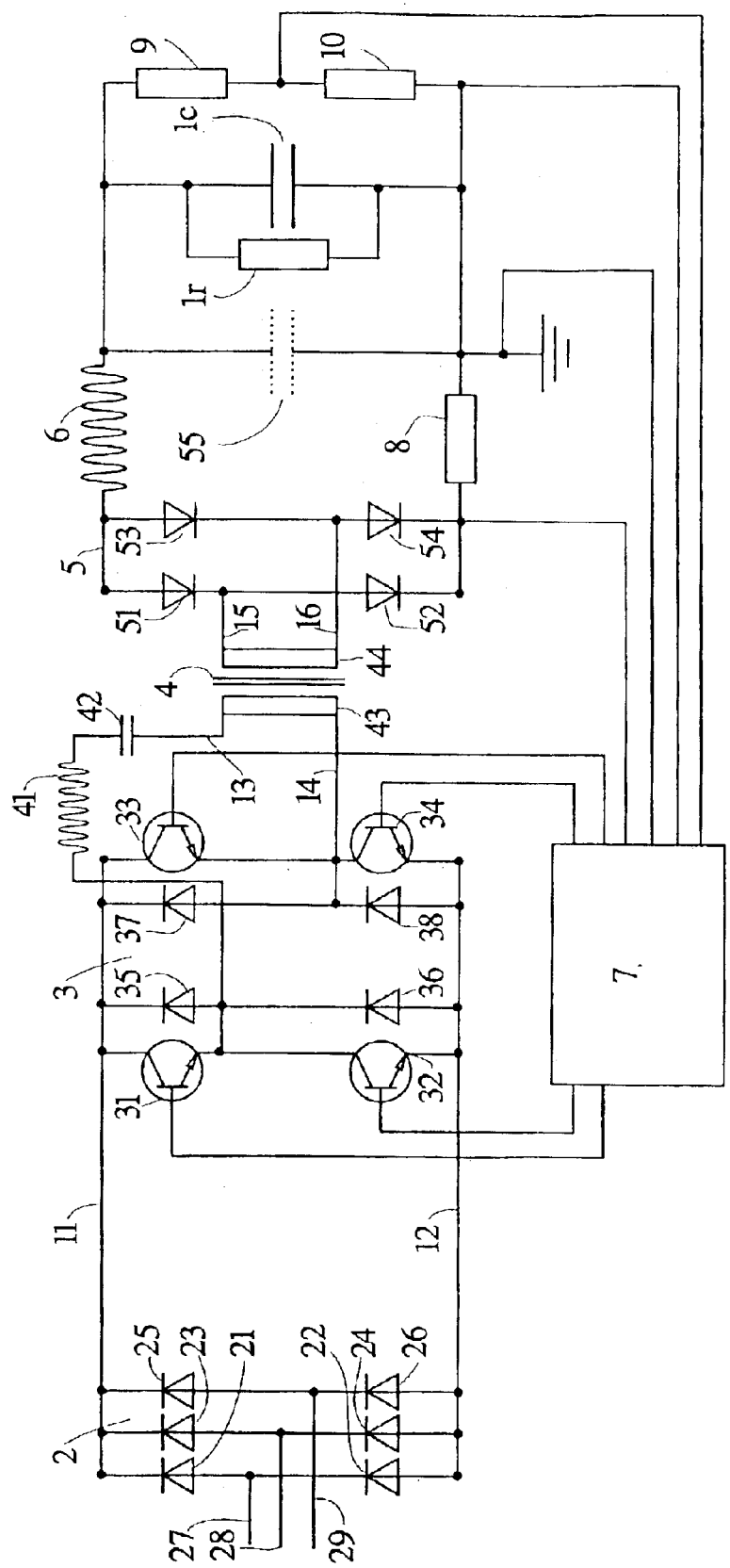
FIG. 2 shows an equivalent circuit diagram for current supply to an electrostatic precipitator, where the electrostatic precipitator is replaced by a capacitor and a parallel-connected resistance.

FIG. 2 shows with an equivalent diagram the same circuit as FIG. 1 with two differences. The precipitator 1 has been replaced by a capacitor 1c, with a capacitance corresponding to the capacitance of the precipitator 1, and a parallel-connected resistor 1r. The stray capacitance across the output of the current generator has been illustrated by a capacitor 55. The capacitor 1c has a capacitance of 10–200 nF and the stray capacitance 55 is approximately 100 pF. The parallel-connected resistor 1r is considerably non-linear during operation but its effect can be disregarded at voltages below the one that gives corona current.

Figure 3:
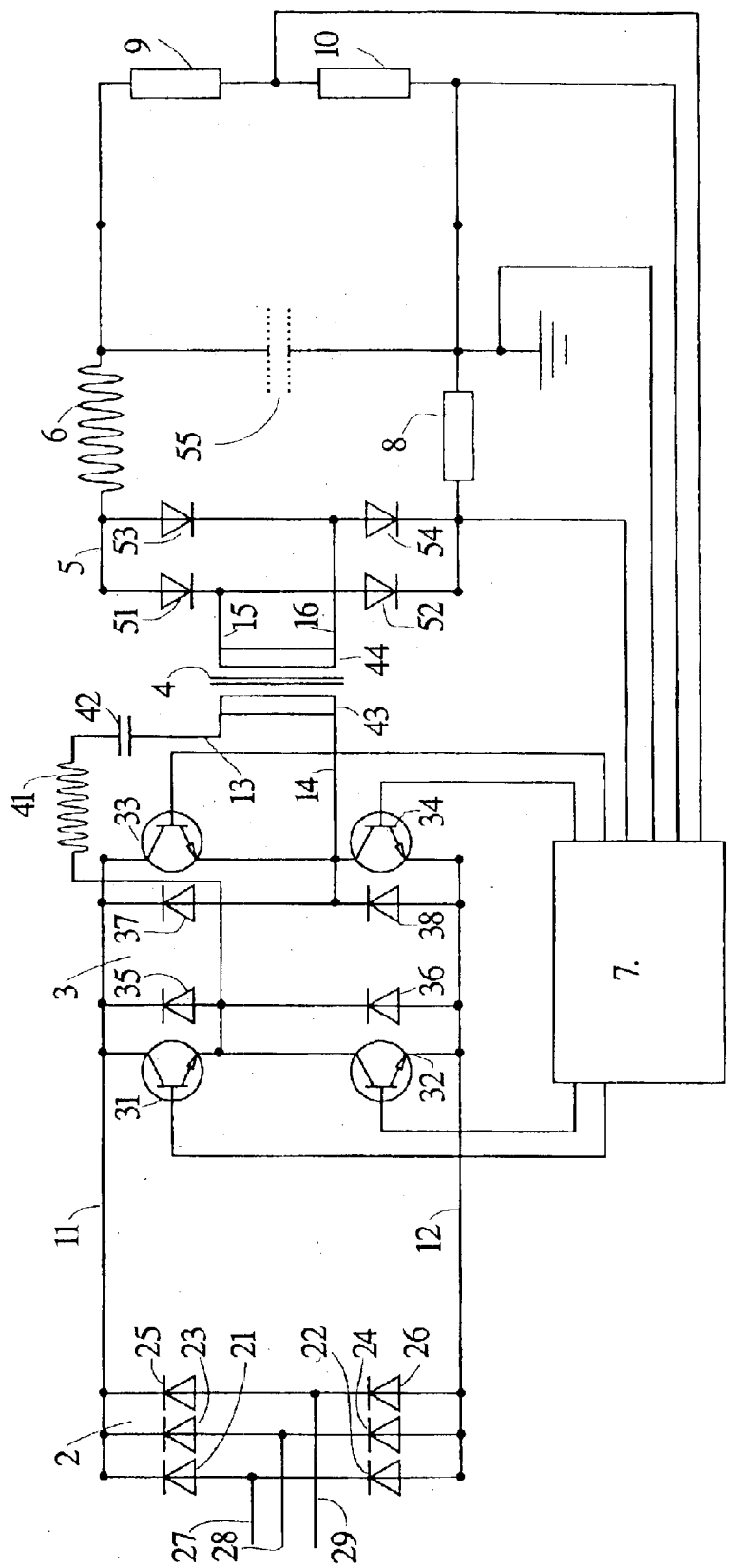
FIG. 3 shows the same equivalent circuit diagram intended for current supply to an electrostatic precipitator, with the components corresponding to the electrostatic precipitator disconnected.

FIG. 3 differs from FIG. 2 only in that the capacitor 1c and the parallel-connected resistor 1r are removed.

Figure 4:
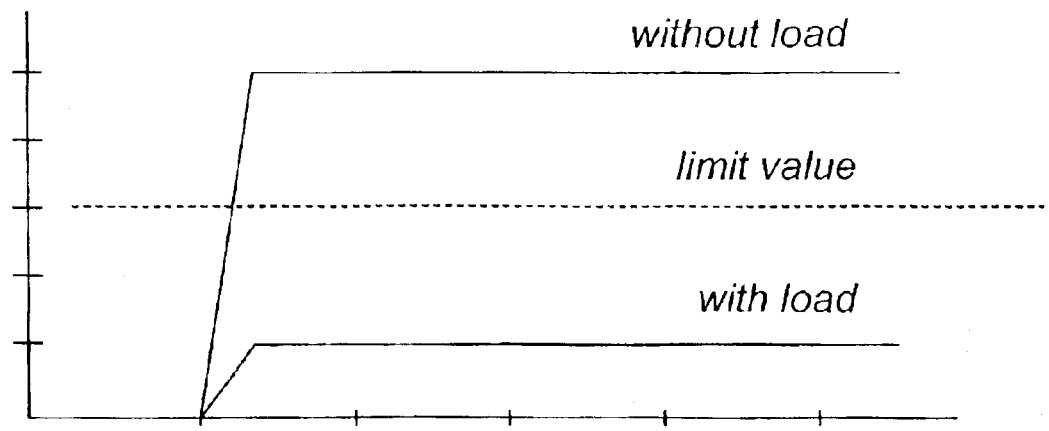
FIG. 4 shows the fundamental difference between the output voltage of a current generator with and without load.

FIG. 4 shows the fundamental difference between the output voltage from a current generator with and without load when a short current pulse is generated. An imaginary limit value that determines whether the load is to be regarded as connected or not is indicated by a broken line.

Figure 5:
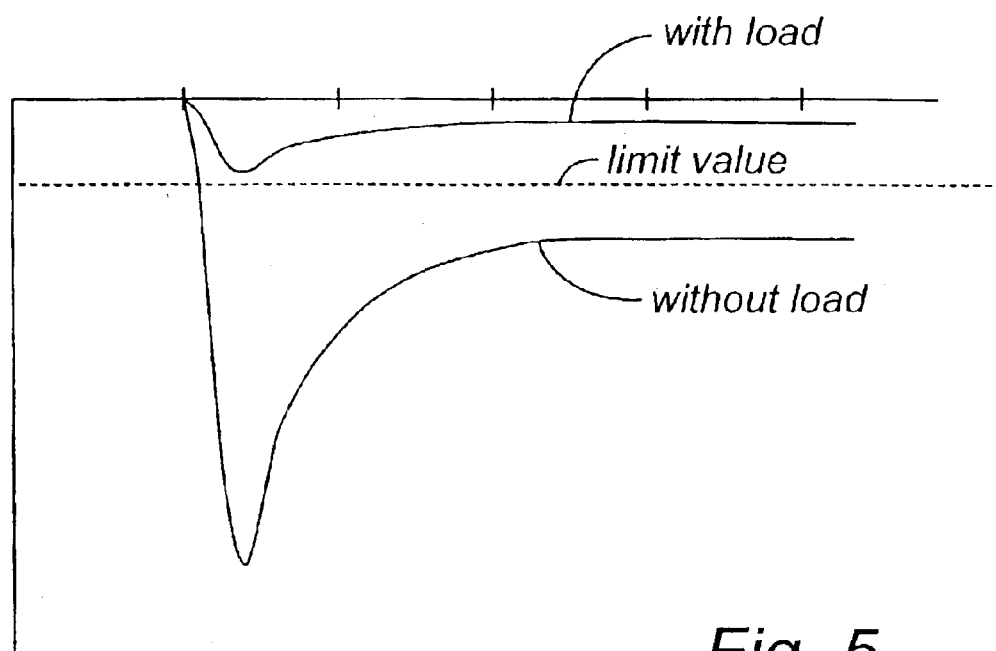
FIG. 5 shows the actual relationship between output voltage of a rectifier for an electrostatic precipitator for operation according to FIG. 2 (with load) and FIG. 3 (without load).

FIG. 5 shows an actual situation when current to an electrostatic precipitator whose discharge electrodes are at negative potential is supplied by means of a voltage transducer and a rectifier according to FIG. 1–FIG. 3. As mentioned above, the polarity is disregarded for the description of this invention. The voltage is thus considered to increase when it approaches negative voltages of increasing absolute amounts. The voltage difference between the graphs marked (without load) and (with load) is greater than the figure shows; the y-axis is to be considered to be non-linear. For the sake of clarity the scale is somewhat distorted.

The inductive components 6 and 41 in the output of the rectifier and the series resonance circuit of the voltage transducer, respectively, give a marked overvoltage for approximately 100 microseconds, after which the voltage levels out and very slowly drops towards zero. Comparisons between measured voltage and the set limit value should therefore he carried out after a slight delay, for example 1 to 10 milliseconds after the pulse. For the same reason, the total charge that is applied during the initial phase in one or more pulses should not be selected to be higher than so that it theoretically reaches approximately half the rated voltage of the rectifier when charging an unloaded output.

In an application of the method according to the invention for the purpose of exemplification, a voltage transducer/rectifier according to FIG. 1–FIG. 3 is intended to be used for the supply of current to an electrostatic precipitator 1. The capacitance of the precipitator is 50 nF, corresponding to approximately a total area for the collecting electrodes of 1000 square metres.

The rectifier can supply 500 mA at maximal permitted voltage of 70 kV. The stray capacitance 55 across the output poles is 100 pF. The voltage across the output is measured by the control equipment 7 via the resistors 9 and 10 connected in parallel with the output of the rectifier, with a sampling interval of 250 ms.

The starting procedure is commenced with an initial phase of 10 ms, wherein first a pulse with the charge of 2 microcoulombs, or a pulse train with a total charge of 2 microcoulombs, is applied. The duration of the pulse is approximately 4 microseconds. Thereafter there is a wait of 1 ms, in order that the overvoltage during the settling time does not cause disturbance, and the control equipment 7 then carries out an evaluation of the subsequent four first sampled output voltages.

With a correctly connected load according to FIG. 2, a voltage of 40V is measured after a short almost imperceptible settling time. When starting without a load according to FIG. 3, a voltage of 20 kV is measured. These voltage values are compared by the control equipment 7 with a limit value of 7 kV, that is 10% of the rectifier's rated voltage. If all four voltage values are below 7 kV, the control equipment changes over to normal operation automatically after 10 ms. If any one of the sampled voltage values is above 7 kV, the control equipment 7 stops the starting procedure and indicates loss of load.

What is claimed is:

1. A method for protecting a DC current generator against overvoltage in the event of a loss of load, comprising:

defining voltage limit value;

generating, when starting the DC current generator, at least one small current pulse during an initial phase;

measuring the voltage across the output of the DC current generator during the initial phase;

starting normal operation only if all the voltages across the output of the current generator measured during the initial phase are below the voltage limit value; and interrupting current generation and indicating a loss of load if any one of the voltages across the output of the DC current generator measured during the initial phase exceeds the voltage limit value.

2. A method according to claim 1, wherein the method is used in starting the supply of pulsating direct current to an electrostatic precipitator, comprising discharge electrodes and collecting electrodes, with an object of maintaining a constant or varying DC voltage between these electrodes.

3. A method according to claim 1, wherein the method is used in starting the supply of direct current from a frequency-modulated voltage transducer, the output voltage of which is transformed and rectified, to an electrostatic precipitator comprising discharge electrodes and collecting electrodes, with an object of maintaining a constant or varying DC voltage between these electrodes.

4. A method according to claim 1, wherein the voltage limit value is defined to be considerably less than both a maximal permitted output voltage of the DC current generator and a normal operating voltage for the application.

5. A method according to claim 1, wherein the total charge that is applied during the initial phase is selected in such a way that the DC current generator without load obtains an output voltage between the voltage limit value and the normal operating voltage.

6. A method according to claim 1, wherein the total charge that is applied during the initial phase is selected in such a way that the DC current generator with load obtains an output voltage below the voltage limit value.

7. A method according to claim 1, wherein the total charge that is applied during the initial phase is selected in such a way that the DC current generator with load obtains an output voltage below 10% of the normal operating voltage.

8. A method according to claim 1, wherein the duration of the initial phase is less than 1 second.

9. A method according to claim 1, wherein the initial phase includes 1–10 pulses, each with a duration less than 10 microseconds.

10. The method of claim 1, wherein the method is used in starting the supply of direct current to an electrostatic precipitator including discharge electrodes and collecting electrodes, with an object of maintaining a constant or varying DC voltage between these electrodes.

11. A method according to claim 1, wherein the voltage limit value is defined to be between 10% and 50% of the normal operating voltage.

12. A method according to claim 2, wherein the voltage limit value is defined to be considerably less than both a maximal permitted output voltage of the DC current generator and a normal operating voltage for the application.

13. A method according to claim 3, wherein the voltage limit value is defined to be considerably less than both a maximal permitted output voltage of the DC current generator and a normal operating voltage for the application.

14. A method according to claim 10, wherein the voltage limit value is defined to be considerably less than both a maximal permitted output voltage of the DC current generator and a normal operating voltage for the application.

15. A method according to claim 2, wherein the total charge that is applied during the initial phase is selected in such a way that the current generator without load obtains an output voltage between the voltage limit value and the normal operating voltage.

16. A method according to claim 3, wherein the total charge that is applied during the initial phase is selected in such a way that the DC current generator without load obtains an output voltage between the voltage limit value and the normal operating voltage.

17. A method according to claim 4, wherein the total charge that is applied during the initial phase is selected in such a way that the DC current generator without load obtains an output voltage between the voltage limit value and the normal operating voltage.

18. A method according to claim 1, wherein the total charge that is applied during the initial phase is selected in such a way that the DC current generator with load obtains an output voltage below 1% of the normal operating voltage.

19. A method according to claim 1, wherein the duration of the initial phase is less than 0.1 second.

20. A method according to claim 1, wherein the duration of the initial phase is less than 0.01 second.

21. A method according to claim 1, wherein the initial phase includes 1–2 pulses, each with a duration less than 10 microseconds.

22. A method according to claim 1, wherein the initial phase includes 1–10 pulses, than 5 microseconds.

23. A method according to claim 1, wherein the initial phase includes 1–2 pulses, each with a duration less than 5 microseconds.

* * * * *